Dec. 5, 1933. W. B. RUNYAN 1,937,847
ANNEALING POT
Filed Dec. 22, 1932
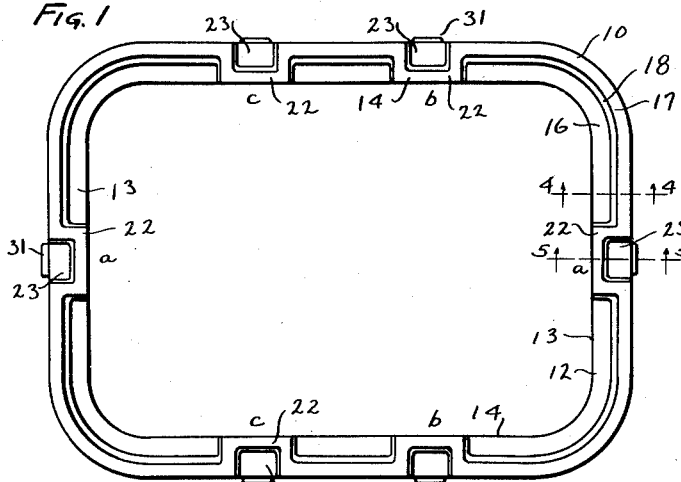
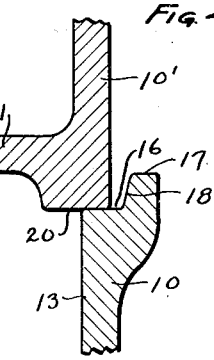
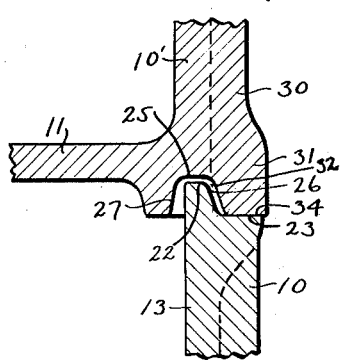
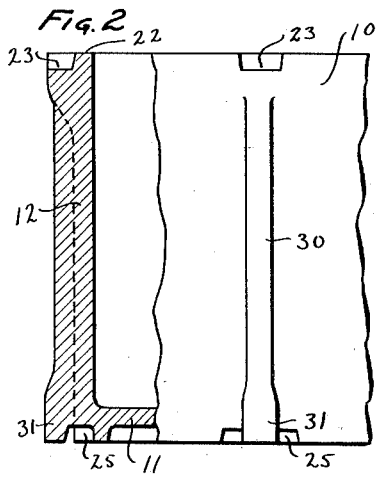
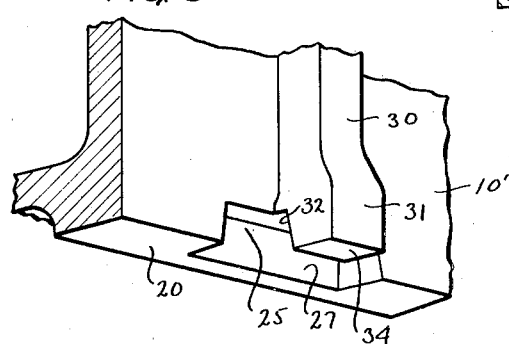
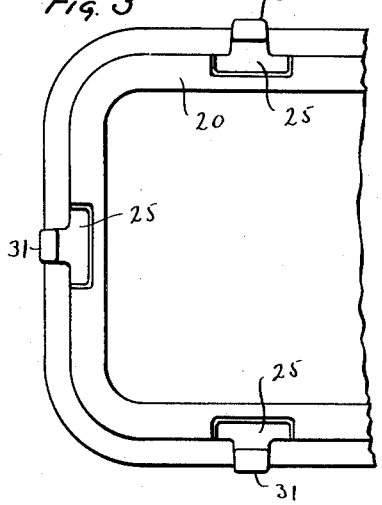
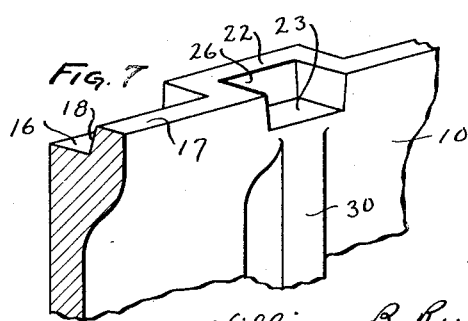
Inventor
William B. Runyan
By Maréchal & Noz
Attorney Patented Dec. 5, 1933

1,937,847

UNITED STATES PATENT OFFICE 1,937,847

ANNEALING POT

William B. Runyan, Dayton, Ohio

Application December 22, 1932
Serial No. 648,380

7 Claims. (Cl. 263—48)

This invention relates to annealing pots and the like.

One object of the invention is the provision of an annealing pot, or like article which is repeatedly subjected to high heat conditions, in which the top and bottom portions of the body walls are so formed that the bottom of one pot is adapted to be adequately supported on the top of a similar pot in a way that prevents both outward bulging and inward collapse of the pot walls.

Another object of the invention is the provision of an annealing pot in which the upper portion of the body wall is provided with an inner seat and an outer retainer wall extending upwardly from the seat, the peripheral continuity of the seat and of the retainer wall being interrupted at spaced locations by upward extensions and recesses respectively, adapted for cooperation and interlocking relation with recesses and extensions provided at the bottom of a pot of similar construction.

Another object of the invention is the provision of a stack of superimposed elements adapted to be subjected to high heat conditions, the upper and lower portions of the body walls being so formed that some parts of the upper wall of one element interfit with portions of a superimposed element to prevent inward collapse while other peripherally displaced parts of the wall interfit in such a way as to prevent outward bulging of the walls of the lower element.

Further objects and advantages of the invention will be apparent from the following description, the appended claims and the accompanying drawing, in which—

Fig. 1 is a top plan view of an annealing pot embodying the present invention;

Fig. 2 is a side elevation of a portion of the pot, shown partly in section;

Fig. 3 is a bottom plan view of a portion of the pot;

Fig. 4 is a section on the line 4—4 of Fig. 1 showing the interfitting relationship of two pots;

Fig. 5 is a section on the line 5—5 of Fig. 1, also showing a portion of a second pot;

Fig. 6 is a perspective view of a fragment at the lower portion of one of the pots; and Fig. 7 is a perspective view of a fragment of the upper portion of a pot.

In the heat treatment of certain metals it is the practice to place the articles to be treated in annealing pots which are stacked one on the other and then placed in an annealing oven where they are subjected to the necessary heat treatment. As the pots are used for this purpose time after time, there is a great tendency for the walls of the pot to deform, the upper unsupported walls of a pot tending to assume a more circular shape. Thus some portions of the pot walls have a tendency to bulge outwardly, while other portions may have a tendency to collapse inwardly. The pots also "grow" due to the successive high heat treatments. These various effects, after a short time, prevent one pot from properly fitting on the top of another and require frequent replacement after a comparatively short period of use.

In accordance with the present invention, however, the top of a pot is so constructed as to properly cooperate and interfit with the bottom of a similar pot superimposed thereon so that, while sufficient play or clearance is provided to permit the usual expansions and contractions of the various pot portions, the top of one pot is held against both inward and outward deformation by the bottom of a superimposed pot in a very effective manner and in a construction that does not require an excessively wide or thick wall structure.

Referring more particularly to the drawing by reference numerals, 10 designates generally an annealing pot having a bottom wall or floor 11 and a body wall 12 extending upwardly therefrom. The pot may be round or square or of any other desired shape, but as herein shown it is of generally rectangular formation, having the end walls 13 and side walls 14. The various walls of the pot are preferably integraly formed as a casting.

The upper portions of the body wall 12 of the pot are preferably substantially wider than the central portions of this wall. The top of the wall throughout the major portion of its extent is provided with a lower inner substantially horizontal seat surface 16. Outwardly of the surface 16 is a retainer wall defined by the upper substantially horizontal surface 17 at the outer side of the pot wall and an upwardly extending surface 18, preferably inclined at a suitable angle as shown in Fig. 4 and extending between the surfaces 16 and 17. The surface 16 is adapted to form a seat for the bottom of the peripheral portion of a similar pot 10'.

As the pots 10 and 10' are of similar shape a description of the bottom portion of the pot 10' will suffice as a description of the bottom of the pot 10. As shown in Fig. 4 the lower side of the pot 10' is provided with a substantially horizontal surface 20 which rests on the surface 16 of the pot 10 although sufficient space is provided between the outer lower edge of the pot 10' and the inclined wall 18 to permit some limited relative movement of the parts and insuring a firm support of one pot on the other. By reason of the substantially complementary form of the upper and lower wall portions of a pot it will be apparent that at those portions referred to the top of the pot 10 is held against any excessive inward collapsing deformation although there is no restriction at those portions against outward bulging movements of the wall of the pot 10.

The upper portions of the walls of the pot 10, however, at peripherally spaced locations are held against outward bulging tendencies. Thus at the locations $a$, $b$, $c$, etc., along the upper wall portion of the pot the continuity of the surfaces 16 and 17 is interrupted, the upper retainer wall being laterally and inwardly offset at these locations. Thus on the seat surface 16 is an upward extension or projection 22 at each of the locations referred to, while there is a recess or depression 23 in the surface 17 outwardly of the projection 22. The recess 23 and the extension 22, however, as shown in Fig. 1, are of a total width substantially corresponding to the width of the wall at the portions adjacent thereof so that the total width of the wall is not excessive although it is so formed as to prevent inward as well as outward bulging or deformation tendencies.

At various points corresponding to the locations $a$, $b$, $c$, etc., the lower portion of the pot 10' is provided with recesses 25 which are large enough in all directions to loosely receive the inwardly offset portion of the upper surface 17 or in other words the extension 22. The upwardly extending surface 26 forming the outer side of projection 22 is preferably inclined at a suitable angle to facilitate the engagement of the parts, the surface 27 of the recess in the pot 10' being also inclined as shown in Fig. 5 for the same purpose. It will be apparent from this same figure that some limited horizontal relative motion between the interfitting parts of the pots 10 and 10' is permitted.

On the sides of the pot 10 are vertical ribs 30. These ribs extend substantially throughout the height of the pot and rigidify the structure, and the lower ends of the ribs project down and preferably curve outwardly at 31, being adapted to project into the recesses 23. The lower ends 34 of the projecting portions of these ribs are provided with inner inclined sides 32 spaced a suitable distance from the inclined sides 26 of the pot 10. The lower rib ends in effect are lugs loosely receivable in the depressions 23 and serving to hold the upper walls of the pot 10 against outward bulging deformation.

The various points along the length of the wall of the pot at which the depressions 23 and extensions 22 are provided are preferably arranged oppositely as shown in Fig. 1, where the two locations $a$—$a$ are laterally opposite one another, and where the locations $b$ and $c$ are also arranged oppositely, although these points may be otherwise arranged and may be of any suitable number, depending upon the shape and strength of the parts.

As previously mentioned, the bottom of the pot 10 is made in a form identically like that of the pot 10', so that a number of pots may be stacked one on the other, the clearance spaces between the various surfaces of different pots permitting their ready assembly in position and permitting a material although limited relative movement in any horizontal direction. Any excessive movements or deformation tendencies of the upper portion of any pot are prevented by the lower side of the pot superimposed on it, the bottom of a pot having a substantially permanent shape due to the interconnection of the lower wall portions by the floor or bottom. An old pot that has been repeatedly used may be readily assembled on or placed below a comparatively new pot. When the pots are stacked together the various joints may be "mudded" so as to effectively seal the contents of the pots and fill in the clearance spaces along the interfitting walls of the pots.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An annealing pot comprising a bottom wall and a body wall extending upwardly therefrom, said body wall including oppositely arranged substantially parallel side portions, the bottom peripheral portion of the pot having a shape substantially complementary to the shape of the top portion of the pot so that the pot will fit on another pot of similar form, one of said portions having upper and lower outwardly extending surfaces and an upwardly extending surface extending between the outwardly extending surfaces, the peripheral continuity of said surfaces being interrupted at spaced locations between the ends of said side portions by recesses in the one and adjacent extensions of the other.

2. An annealing pot comprising a bottom wall and a body wall extending upwardly therefrom, the bottom peripheral portion of the pot having a shape interfitting with the top of a similar pot, certain parts of the top of said body wall having a depressed inner seat for receiving the outer lower portion of a similar pot, prevented thereby from excessive inward deformation, while peripherally spaced parts of the top of the body wall are of another form there being supplemental interfitting parts provided on the bottom of a similar pot to prevent outward bulging of the said top.

3. An annealing pot comprising a bottom wall and a body wall extending upwardly therefrom, the bottom peripheral portion of the pot having a shape interfitting with the top of a similar pot, certain parts of the top of said body wall providing a seat for supporting the lower portion of a similar pot, and pot correlating means interrupting the continuity of said seat at peripherally spaced locations, the bottom of each pot having complemental parts at corresponding locations adapted for loose interlocking engagement with the corresponding means at the top of a similar pot to hold the same against both inward and outward excessive deformation.

4. An annealing pot comprising a bottom wall and a body wall extending upwardly therefrom, the bottom peripheral portion of the pot having a shape so as to fit on a pot of similar form, the top portion having an inner lower seat surface, an upper outwardly extending surface and an upwardly extending surface extending between the upper and lower surfaces, the peripheral continuity of said upper and lower surfaces being interrupted at spaced locations by recesses in the upper surface and upward projections from the inner surface, said bottom having recesses, and downwardly extending projections provided outwardly thereof and adapted respectively for cooperation with the extensions and recesses of the top of a similar pot.

5. An annealing pot comprising a bottom wall and a body wall extending upwardly therefrom, the bottom peripheral portion of the pot being shaped to interlock with the top portion of a pot of similar form, the bottom peripheral portion of the pot at spaced locations having recesses and lugs provided outwardly of said recesses, the top of the pot at correspondiingly spaced locations having projections extending upwardly from the inner side thereof and recesses in the outer side thereof for respective cooperation with the recesses and the lugs of a similar pot, the upper wall of the pot between said spaced locations having an inner depressed seat adapted to receive the lower peripheral portion of a pot of similar form.

6. In combination, a stack of superimposed elements of the character described, one element having a peripheral wall the upper portion of which is provided with a substantially horizontal seat and an upwardly and laterally offset outer retainer wall cooperating respectively with the bottom and the lower outer edge of the superimposed element, said outer retainer wall having spaced depressions and said seat having upward extensions adjacent said depressions, said superimposed element having recesses loosely receiving said extensions and outer lugs extending down loosely into said depressions so that the adjacent walls of superimposed elements are respectively interlocked against both inward and outward deformation.

7. In combination, a stack of superimposed annealing pots all of similar form, one pot having a peripheral wall the upper portion of which is provided with a substantially horizontal inner seat and an upwardly and laterally offset outer retainer wall cooperating respectively with the bottom and the lower outer edge of a superimposed element, the perpiheral continuity of said outer retainer wall being interrupted at spaced locations by depressions and the continuity of the seat being interrupted at correspondingly spaced locations by upward extensions, said superimposed element having recesses for receiving said extensions and outer lugs extending down into said depressions so that the upper walls of said one pot are held against both inward and outward deformation by the superimposed pot.

WILLIAM B. RUNYAN.